United States Patent [19]

Hoofe, III

[11] Patent Number: 5,742,977
[45] Date of Patent: Apr. 28, 1998

[54] WHEELS FOR RESTAURANT AND INDUSTRIAL EQUIPMENT AND SHELVING

[76] Inventor: William J. Hoofe, III, P.O Box 5044, Newport Beach, Calif. 92662

[21] Appl. No.: 797,777

[22] Filed: Feb. 7, 1997

Related U.S. Application Data

[63] Continuation-in-part of Ser. No. 542,894, Oct. 13, 1995, abandoned, which is a continuation-in-part of Ser. No. 150,587, Nov. 10, 1993, abandoned, which is a continuation of Ser. No. 886,036, May 20, 1992, abandoned, which is a continuation of Ser. No. 639,911, Nov. 10, 1991, abandoned.

[51] Int. Cl.$^6$ ............................................... B60B 33/00
[52] U.S. Cl. ............................................... 16/30; 16/43
[58] Field of Search ............................ 16/30, 31, 31 R, 16/43, 19, 18 R, 42 R, 2.1, 108, 109; D8/374, 375

[56] References Cited

U.S. PATENT DOCUMENTS

| | | |
|---|---|---|
| D. 181,662 | 12/1957 | Modarelli . |
| D. 212,935 | 12/1968 | Appel . |
| 299,651 | 6/1884 | Ladisch . |
| 507,915 | 10/1893 | Little ........................ 248/188.4 |
| 523,772 | 7/1894 | Mann et al. . |
| 591,053 | 10/1897 | Nicholson ..................... 248/188.4 |
| 762,471 | 6/1904 | Dori et al. . |
| 804,809 | 11/1905 | Graham . |
| 934,005 | 9/1909 | Neuberth . |
| 1,061,912 | 5/1913 | Hilfrank . |
| 1,389,572 | 9/1921 | Berg . |
| 1,467,744 | 10/1923 | Winkler et al. . |
| 1,604,293 | 10/1926 | Lehmann . |
| 2,103,202 | 12/1937 | Green . |
| 2,206,120 | 7/1940 | Peterson ........................... 16/42 R |
| 2,225,753 | 2/1940 | Milich . |
| 2,295,911 | 9/1942 | Page . |
| 2,691,793 | 10/1954 | Jacobs . |
| 2,774,609 | 1/1956 | Winger . |
| 3,199,141 | 8/1965 | Fontana . |
| 4,788,741 | 12/1988 | Hilborn ............................... 16/43 |
| 5,069,309 | 12/1991 | Swiderski et al. . |

OTHER PUBLICATIONS

A.D. 1895, Oct. 26, No. 20,183—Smith's Complete Specification Hamilton Caster & Mfg. Co., Catalog 240, "Upside Down Casters," p. 43, Nov. 1983.

*Primary Examiner*—Chuck Mah
*Attorney, Agent, or Firm*—Blakely, Sokoloff, Taylor & Zafman

[57] ABSTRACT

A wheel adapter that can be slipped onto the legs of equipment and shelving, such that the equipment and shelving can be rolled into a different location. The adapter comprises a wheel which is attached to a socket that has an inner socket cavity. A secondary adapter is coupled to the socket. The secondary adapter has an opening that allows the leg to be inserted into the socket cavity and secured to the wheel adapter. There are typically a plurality of different size secondary adapters. The opening for each secondary adapter is one of a number of different sizes and shapes that correspond to the size and shape of the leg. The secondary adapter may be easily replaced by another adapter so that the overall assembly can be used with different legs. The wheel can be of the caster variety to allow the equipment and shelving to be moved in any direction. To attach the adapters, the user merely picks up the leg and inserts the leg through the opening and into the socket cavity, repeating this until all of the legs have a corresponding adapter wheel.

10 Claims, 3 Drawing Sheets

WHEELS FOR RESTAURANT AND INDUSTRIAL EQUIPMENT AND SHELVING

This application is a continuation-in-part of application Ser. No. 08/542,894, filed on Oct. 13, 1995, now abandoned, which is a continuation-in-part of application Ser. No. 08/150,587, filed on Nov. 10, 1993, now abandoned, which is a continuation of application Ser. No. 07/886,036, filed on May 20, 1992, now abandoned, which is a continuation of application Ser. No. 07/639,911, filed on Nov. 10, 1991, now abandoned.

FIELD OF THE INVENTION

The present invention relates to wheels that can be readily slipped over the legs of restaurant and industrial equipment and shelving.

BACKGROUND OF THE INVENTION

Typically equipment and shelving will have legs with no wheels, such that the equipment and shelving is stationary when placed into location. It is desirable to move the equipment and shelving to clean the floor, or relocate the equipment and shelving for any other reason. This can be difficult when the equipment and shelving is heavy and/or bulky, which is typically the case with industrial strength metal tables. What is needed is a wheel adapter that can be easily slipped over the legs of equipment and shelving, such that the equipment and shelving can be readily moved to a different location.

U.S. Pat. No. 762,471 issued to Dori and U.S. Pat. No. 2,774,609 issued to Winger disclose wheel adapters that require fasteners to secure the wheels to the legs of a table. Fasteners increase the amount of time required to install and remove the adapters. Additionally, the fasteners increase the cost of producing the adapters. Furthermore, the adapters disclosed in these references are limited to furniture constructed from wood. Most industrial furniture is constructed from metal. Therefore it would be desirable to provide a wheel adapter that does not require fasteners to secure the adapter to the table.

U.S. Pat. No. 2,691,793 issued to Jacobs discloses a wheel adapter which has four concentric cavities that can be fit onto four different size table legs. The height of any single cavity is significantly smaller than the width of the cavity opening. When placed onto a heavy piece of furniture with a relatively high center of gravity, the shallow cavity will not provide enough structural support to maintain the legs in the adapter. This problem becomes worse for furniture legs that have a diameter smaller than the cavity openings. Additionally, the Jacobs adapter has a plurality of steps which increases the cost of mass producing the part. It would therefore be desirable to provide a wheel adapter that is relatively inexpensive to produce, does not require fasteners and will adequately support the legs of any industrial furniture.

SUMMARY OF THE INVENTION

The present invention is a wheel adapter that can be slipped onto the legs of equipment and shelving, such that the equipment and shelving can be rolled into a different location. The adapter comprises a wheel which is attached to a socket that has an inner socket cavity. A secondary adapter is coupled to the socket. The secondary adapter has an opening that allows the leg to be inserted into the socket cavity and secured to the wheel adapter. There are typically a plurality of different size secondary adapters. The opening for each secondary adapter is one of a number of different sizes and shapes that correspond to the size and shape of the leg. The secondary adapter may be easily replaced by another adapter so that the overall assembly can be used with different legs. The wheel can be of the caster variety to allow the equipment and shelving to be moved in any direction. To attach the adapters, the user merely picks up the leg and inserts the leg through the opening and into the socket cavity, repeating this until all of the legs have a corresponding adapter wheel.

DETAILED DESCRIPTION OF THE INVENTION

Figure 1:
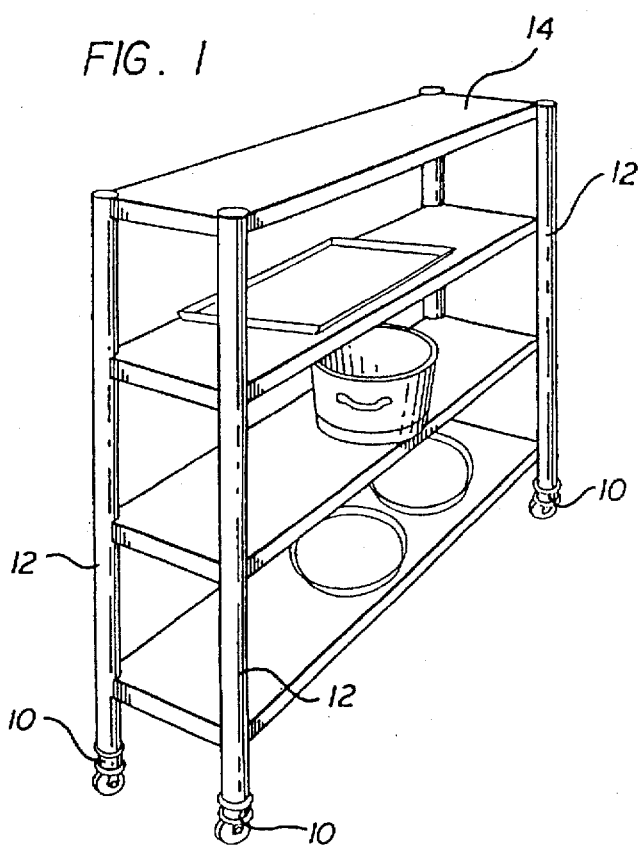
FIG. 1 is a perspective view of a shelf with wheel adapters of the present invention slipped onto the legs of the shelf.

Referring to the drawings more particularly by reference numbers, FIG. 1 shows a wheel adapter 10 slipped onto the legs 12 of an industrial shelf 14. Although an industrial strength shelf 14 is shown, it is understood that the adapters 10 can be slipped onto the legs of any type of equipment or furniture, it being understood that the wheel adapter of the present invention is particularly useful for tables and other equipment typically used in the restaurant industry. FIG. 1 depicts an industrial shelf 14 typically used in the restaurant industry, wherein the shelf 14 originally has no wheels and must be relocated to another location.

Figure 2:
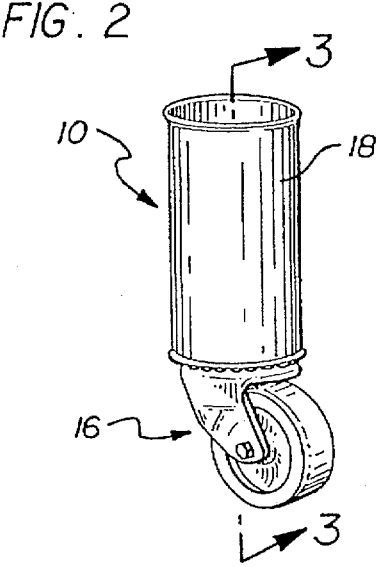
FIG. 2 is a perspective view of a wheel adapter comprising a wheel attached to a socket.
Figure 3:
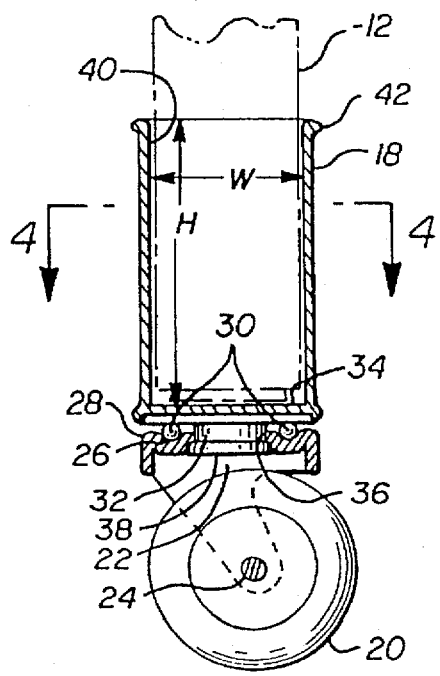
FIG. 3 is a cross-sectional view of the wheel adapter of FIG. 2, taken at line 3—3, showing a leg in phantom inserted into the cavity of the socket.

FIGS. 2 and 3 show a preferred embodiment of the wheel adapter 10 comprising a wheel assembly 16 attached to a socket 18. A wheel 20 is attached to a flange 22 by a pin 24. The flange 22 having a recessed groove 26 on the top surface 28 that contains a plurality of ball bearings 30 located about the periphery of the groove 26. A pintle 32 is attached to a base plate 34, that is attached to the bottom of the socket 18. The plate 34 can be welded to the socket 18 or attached by any other suitable method. The pintle 32 extends through an aperture 36 in the flange 22 and has a head portion 38 that engages the underside of the top of the flange 22, allowing the flange 22 and wheel 20 to rotate relative to the pintle 32 and socket 18. The ball bearings 30 are in contact with the base plate 34, providing structural support for the socket 18 while allowing the wheel 20 to rotate relative to the socket 18 about the vertical axis. This wheel assembly 16 is known in the art as a caster, which will allow the restaurant equipment or shelving to easily move in any direction. The caster assembly 16, which encompasses the wheel 20 attached to the base plate 34, can be constructed or purchased as a separate subassembly that can be attached to sockets 18 of various sizes and forms. It should be noted that the adapter 10 can be constructed without the base plate 34, wherein the pintle 32 is attached directly to the socket 18. The base plate 34 provides additional strength and an easier means of attaching the caster subassembly.

The socket 18 has a cavity 40 with an essentially uniform cross-sectional area along the longitudinal axis of the socket 18. The uniform cross-section allows the adapter to be slip fitted onto the leg. The socket cavity 40 has a depth H and an inner diameter W. In the preferred embodiment, the depth H is no less than one inch. Additionally, the depth H is preferably at least twice the inner diameter W of the socket cavity 40. The minimum socket cavity depth dimension and ratio will insure that the leg 12 will not fall out of the socket 18 when an end user pushes the shelves 14, even when the shelves are particularly weighted and have a relatively high center of gravity. For industrial furniture it is critical that the socket 18 have the minimum 1 inch depth and 2:1 ratio.

Figure 4A:
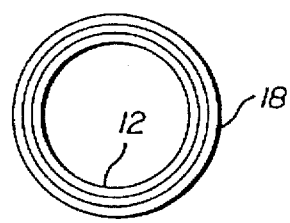
FIG. 4a is a cross-sectional top view of FIG. 3, taken at line 4—4, showing a circular leg inserted into the socket of the wheel adapter.
Figure 4B:
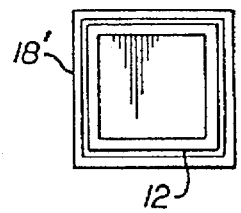
FIG. 4b is a cross-sectional top view similar to FIG. 4a, showing a square leg inserted into a square shaped socket.
Figure 4C:
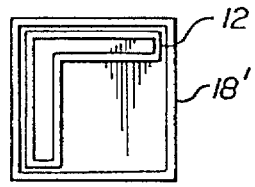
FIG. 4c is a cross-sectional top view similar to FIG. 4a, showing a leg constructed from angle iron inserted into a square shaped socket.

The cavity 40 can be of any size to fit any size leg 12, the cavity 40 typically being slightly larger than the leg 12 to allow the same to slide into the cavity 40 as shown in FIG. 3. The cavity 40 and socket 18 can be of any shape, to allow easy adaptation to legs of various configurations. As shown in FIGS. 4a–4c the socket 18 can accommodate circular, square and angle shaped legs 12, wherein the socket has a circular 18 or square shape 18'.

The socket 18 can be constructed from metal, plastic or other similar type material and be formed as an extruded can or as a tube with two openings, wherein the first base plate 34 is attached at one end such that it closes one of the tube openings. The flange 22 and wheel 20 can also be constructed from various materials sufficient to support the attached restaurant equipment or shelving. The socket 18 can have a flared lip 42 to lead the leg 12 into the socket cavity 40.

Figure 5:
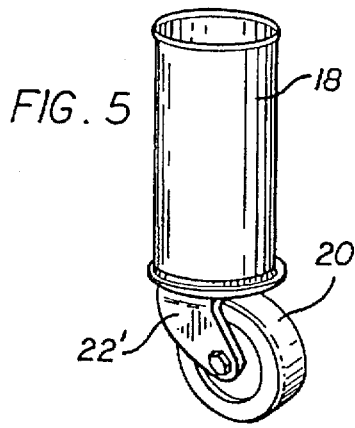
FIG. 5 is a perspective view of an alternate embodiment of the wheel adapter, wherein the wheel is rigidly attached to the socket.
Figure 6:
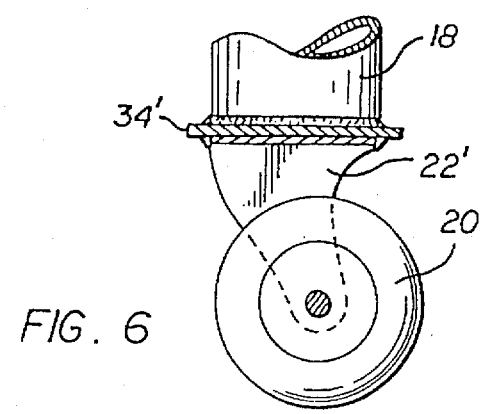
FIG. 6 is a side view of FIG. 5, showing the wheel flange attached to the socket by a base plate.

FIGS. 5 and 6 show an alternate embodiment of the wheel adapter 10, wherein the wheel 20 is attached to the socket 18 by a flange 22' rigidly connected to the bottom of the socket 18, such that the wheel 20 cannot rotate relative to the socket about the vertical axis. This embodiment being preferable for heavy restaurant equipment or shelving that exceeds the structural limitations of a typical caster. As shown in FIG. 6, a base plate 34 can be interposed between the flange 22' and the bottom of the socket 18 to provide additional support.

Figure 7:
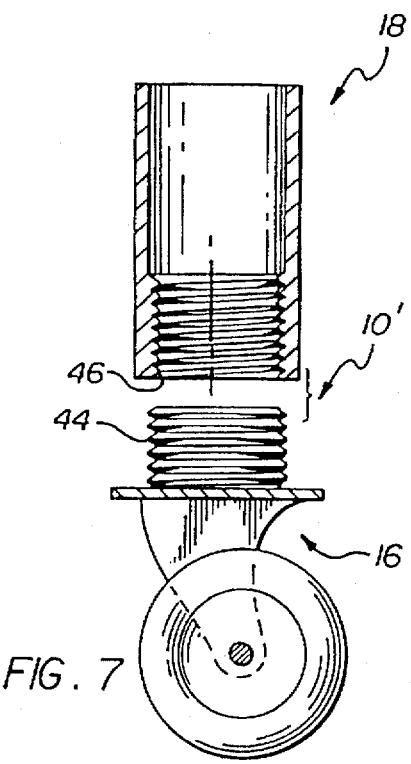
FIG. 7 is a cross-sectional view of a two piece wheel adapter, wherein a wheel is attached to a socket with matching threads.

FIG. 7 shows a two piece wheel adapter 10' having a wheel assembly 16' with a threaded stem 44 that mates with a threaded portion 46 of a socket 18' such that the wheel assembly 16' screws into the socket 18'. The socket 18' may be of varying sizes and shapes, so that the same wheel assembly 16' can be fitted with different sockets 18' of varying sizes and shapes. In the preferred embodiment, each socket 18' and wheel assembly 16' has the same thread size such that any socket 18' (square or round, large or small) can fit any wheel assembly 16'. Although the wheel assembly 16' is shown with a male stem 44 that threads into the socket 18, it is understood that the wheel assembly 16' may have a female thread that receives a male threaded portion of the socket 18'. Instead of having threads in the socket 18', the same may be simply pressed onto the flange stem 44 which may or may not be threaded. In addition to expanding the use of a wheel assembly 16', the two piece design provides for easy manufacture of the wheel adapter 10', wherein the same is assembled by merely screwing the two components together.

To use the wheel adapter 10, the user merely picks up the leg 12 and inserts the leg 12 into the cavity 40 of the socket 18. There is no need for additional fastening, such as screws or springs. The height of the socket 18 is optional, but shall be tall enough that the leg 12 does not slide out of the cavity 40, yet short enough so the user does not have to lift the restaurant equipment or shelving an undesirable amount to attach the adapter 10. Thus what is disclosed is a device that allows a stationary piece of restaurant equipment or shelving to become mobile, allowing the restaurant equipment or shelving to be moved to a new location.

Figure 8:
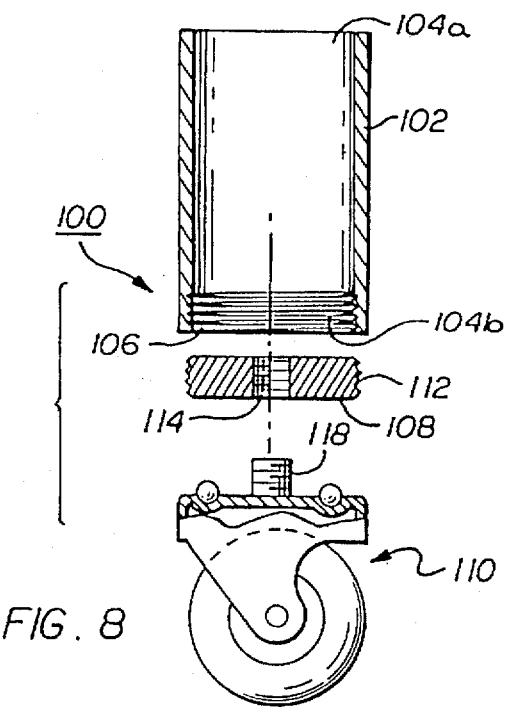
FIG. 8 is a cross-sectional view of an alternate embodiment of the wheel adapter of FIG. 1, showing a wheel assembly is coupled to a tube by a plate that is screwed into the tube.

FIG. 8 shows another alternate embodiment of the present invention. The wheel adapter 100 has a tube 102 with openings 104a and 104b at both ends. The tube 102 has internal threads 106 at the second opening 104b. The adapter 100 also has a plate 108 which couples a wheel assembly 110 to the tube 102. The plate 108 has external threads 112 and a threaded hole 114. The plate 108 is screwed into the internal threads 106 until the plate 108 is securely fastened to the tube 102. The wheel assembly 110 has an externally threaded shaft 118 that screws into the threaded hole 114. A bonding agent may be applied to the threads 106, 112, 114 and 118 to further secure and attach the members 102, 108 and 110.

Figure 9:
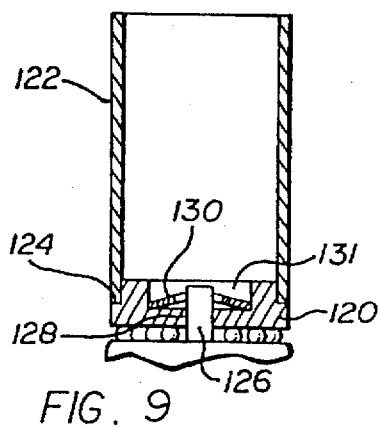
FIG. 9 is a cross-sectional view of a wheel adapter similar to FIG. 8 showing the plate pressed into the tube and the shaft of a wheel assembly pressed into the plate.

FIG. 9 shows an alternate embodiment, wherein a plate 120 is pressed into the tube 122. The plate 120 may also be welded to the tube 122 at the outer interface 124 of the two members. The weld may be an alternative, or an addition to the press fit between the plate 120 and tube 122. The shaft 126 of the wheel assembly (not shown) may be pressed into a bore 128 in the plate 120. The shaft 126 may have a spring washer 130 that engages a counterbore 131 within the plate 120, to prevent the shaft 126 from being pulled out of the bore 128. Although a press fit plate 120 having a press fit shaft 126 is shown and described, it is to be understood that the shaft may be threaded and screwed into the plate as shown in FIG. 8. Likewise, the press fit shaft 126 may be implemented with the externally threaded plate 108 shown in FIG. 8.

Figure 10:
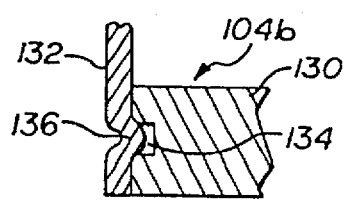
FIG. 10 is a sectional view of an alternate embodiment showing a portion of the tube pushed into an annular groove within a plate.
Figure 11:
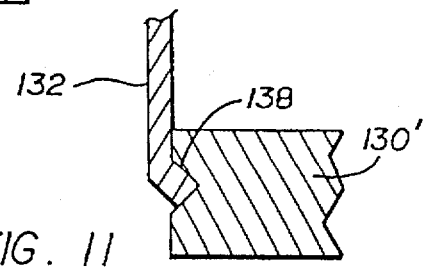
FIG. 11 is a sectional view similar to FIG. 10, showing the end of the tube pushed into a groove in a plate.

FIGS. 10 and 11 show alternate methods of attaching a plate 130 to a tube 132. As shown in FIG. 10, the plate 130 is inserted into the second opening 104b of the tube. The tube 132 and plate 130 are then rotated under a roller that pushes a portion of the tube into an annular groove 134 in the plate 130. The tube protrusion 136 secures the plate 130 to the tube 132. FIG. 11 shows a similar construction, wherein the end of the tube 132 is pushed into a V shaped groove 138 in the plate 130'. The embodiments shown in FIGS. 8–11, disclose wheel adapters that are easy to assemble and inexpensive to produce. With the three piece adapters (tube, plate and wheel assembly) shown and described, different stock parts may be constructed and assembled per customer specification. For example, different types of wheel assemblies may be used with a standard stock tube and plate. Likewise, different size tubes and plates may be used with a stock wheel assembly. The manufacturer is therefore capable of readily producing various adapter sizes and types.

Figure 12:
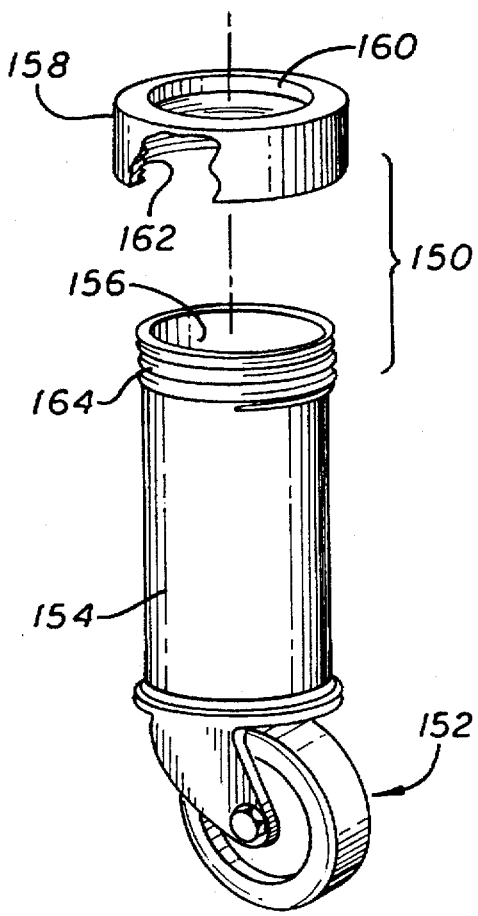
FIG. 12 is sectional view of an alternate embodiment of a wheel adapter with a secondary leg adapter.

FIG. 12 shows an alternate embodiment of a wheel adapter 150. The adapter 150 includes a wheel assembly 152 that is attached to a socket 154. The socket 154 has a socket cavity 156. The wheel assembly 152 and the structure coupling the assembly 152 to the socket 154 may include any of the embodiments shown in FIGS. 3, 7, 8 or 9.

The adapter 150 includes a secondary adapter 158 that is coupled to the socket 154. The secondary adapter 158 has a center opening 160 that allows a leg to be inserted into the socket cavity 156. The wheel adapter 150 may be sold with a number of secondary adapters 158 that each have a different opening size and/or shape. The end user can attach a secondary adapter 158 which has an opening size/shape that corresponds to the size and shape of the leg 12.

Figure 13:
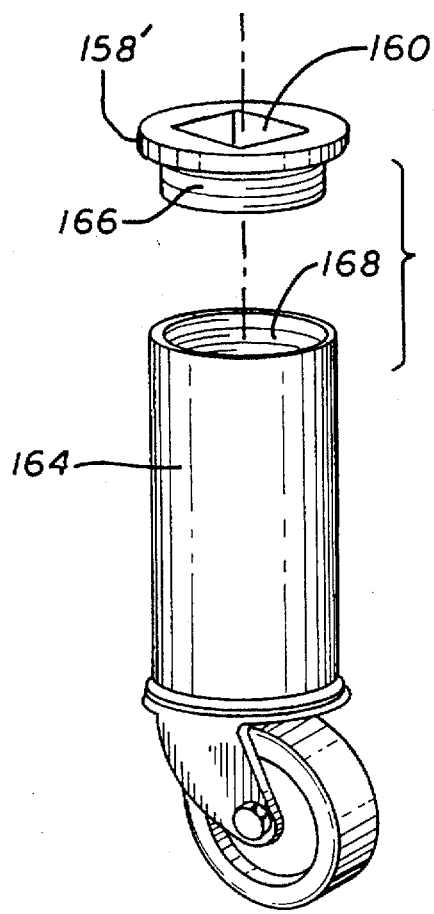
FIG. 13 is a sectional view of an alternate embodiment of a wheel adapter with a secondary leg adapter.
Figure 14:
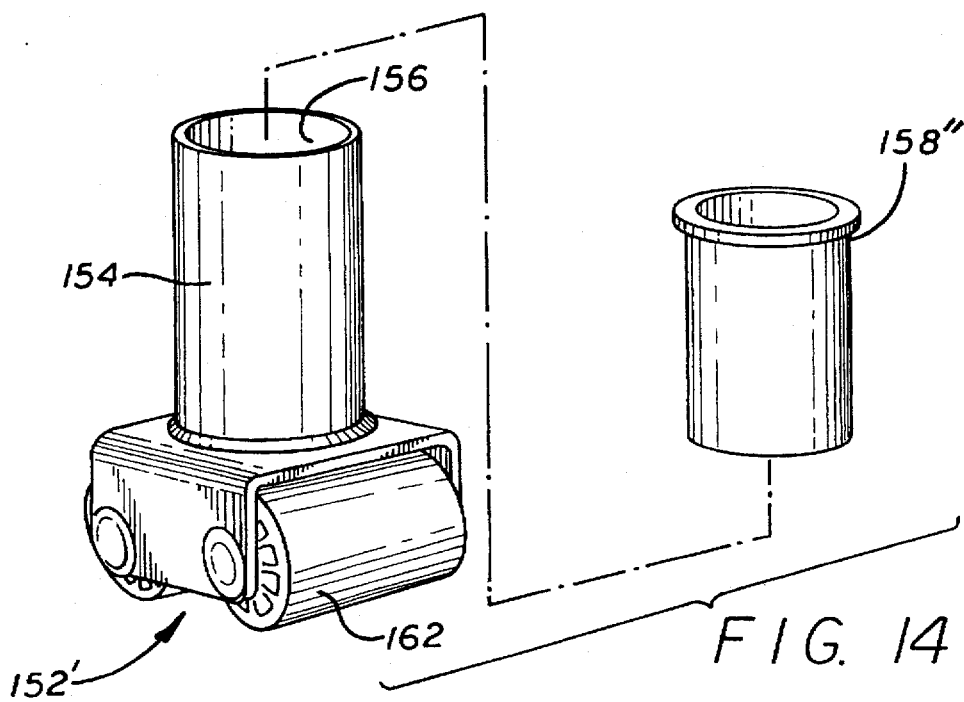
FIG. 14 is a sectional view of an alternate embodiment of a wheel adapter with a secondary leg adapter.

The secondary adapter 158 may have an internal thread 162 which cooperates with an external thread 164 of the socket 154 to attach the adapter 158 to the socket 154. As shown in FIG. 13, as an alternate embodiment, the secondary adapter 158 may have an external thread 166 that cooperates with an internal thread 168 of the socket 154. The opening 160 may have a circular shape as shown in FIG. 12 or a square shape as shown in FIG. 13. As shown in FIG. 14, as yet another embodiment, the secondary adapter 158" may have an outer diameter approximately equal to the diameter of the socket cavity 156 so that the adapter 158" has a slip fit with the socket 154. The secondary adapter 158" may be constructed from a variety of different material including metal, wood, plastics, etc.

The secondary adapters 158, 158' or 158" can be constructed with well known stamping, threading and drilling process which minimize the cost of mass producing a wheel adapter. Additionally, the secondary adapter 158 allows the same wheel assembly to be used with furniture legs having different sizes and shapes.

While certain exemplary embodiments have been shown and described in the above description and the accompanying drawings, it is to be understood that such embodiments are merely illustrative of, and not restrictive on the broad invention, and that this invention not be limited to the specific constructions and arrangements shown and described, since various other modifications may occur to those ordinarily skilled in the art. For example as shown in FIG. 14 the wheel assembly 152' may have a pair of roller wheels 162 which increase the support and stability of the adapter.

What is claimed is:

1. A wheel adapter that slips onto a leg of a piece of industrial equipment, comprising:

a wheel;

a socket attached to said wheel, said socket having a socket cavity; and, a secondary adapter that is coupled to said socket, said secondary adapter having an opening that receives the leg and allows the leg to extend into said socket cavity, said opening being one of a plurality of different sizes to accommodate different size legs.

2. The wheel adapter as recited in claim 1, wherein said secondary adapter is screwed onto an outer thread of said socket.

3. The wheel adapter as recited in claim 1, wherein said secondary adapter is screwed into an inner thread of said socket.

4. The wheel adapter as recited in claim 1, wherein said secondary adapter slides into said socket cavity.

5. The wheel adapter as recited in claim 1, further comprising a flange that couples said wheel to said socket.

6. The wheel adapter as recited in claim 5, wherein said flange has a first threaded portion that threads into a second threaded portion of said socket, wherein said flange and said socket are separate components that can be screwed together to attach said wheel to said socket.

7. The wheel adapter as recited in claim 1, wherein said opening of said secondary adapter is shaped as a square.

8. The wheel adapter as recited in claim 1, wherein said opening of said secondary adapter is shaped as a circle.

9. The wheel adapted as recited in claim 1, further comprising a plurality of ball bearings which allow said wheel to swivel.

10. A method of modifying an essentially stationary piece of industrial equipment such that the industrial equipment can be easily relocated, wherein the industrial equipment has at least one leg, comprising the steps of:

a) providing a wheel adapter that has a wheel, and a socket attached to said wheel, said socket having a socket cavity;

b) coupling a secondary adapter to said socket, said secondary adapter having an opening that is one of a plurality of different sizes to accommodate different size legs;

c) lifting the industrial equipment and the leg;

d) placing said wheel adapter beneath the leg, such that the leg is aligned with said opening of said secondary adapter; and, e) lowering the leg through said opening and into said socket cavity so that the leg is secured by said wheel adapter.

* * * * *